UNITED STATES PATENT OFFICE.

RICHARD KIDDER MEADE, OF NAZARETH, PENNSYLVANIA.

PORTLAND CEMENT AND PROCESS FOR MAKING THE SAME.

No. 866,376.     Specification of Letters Patent.     Patented Sept. 17, 1907.

Application filed February 28, 1907. Serial No. 359,747.

*To all whom it may concern:*

Be it known that I, RICHARD KIDDER MEADE, a citizen of the United States, residing at Nazareth, in the county of Northampton and State of Pennsylvania, have invented certain new and useful Improvements in Portland Cement and Processes of Making the Same, of which the following is a specification.

This invention relates to an improved process of making Portland cement, and to the product resulting therefrom, and has particular reference to a process of making a high grade of Portland cement wherein there is employed high magnesian limestone, which has not heretofore been successfully utilized in cement manufacture.

In the manufacture of Portland cement, as commonly practiced, a mixture of argillaceous and calcarious substances in the proper proportions is ground to an impalpable powder, then burned to the point of incipient vitrifaction, and the resulting greenish-black clinker reduced to an impalpable powder. It has been found by experience that the argillaceous material, as silica, oxid of iron and alumina, should bear to the calcarious material, as lime a ratio of approximately 1 to 2.

A large proportion of the Portland cement manufactured in the United States is made from an argillaceous limestone called "cement rock" found in Warren county, New Jersey, and in Berks, Lehigh and Northampton counties, Pennsylvania. This rock contains usually from 65 to 75 per cent. carbonate of lime, and from 18 to 30 per cent. argillaceous matter, principally silica, oxid of iron and alumina. When the rock contains less than 75 per cent. of carbonate of lime, it is necessary to add to the same a quantity of limestone, preferably pure, sufficient to bring the total carbonate of lime content in the mixture up to approximately 75 per cent. There are in the vicinity of the "cement rock" deposits throughout the sections mentioned extensive deposits of limestone containing more than 4 per cent. of magnesia, or what is termed in the art high magnesian limestone, but in these sections there is very little limestone having a low content of magnesia. Now the high magnesian limestone cannot at present be used with the cement rock, because Portland cement made from such limestone will have low tensile strength, and will also expand and crack when used in concrete. It has therefore been found necessary in working the "cement rock" to bring limestone, practically free from or containing a low content of magnesia from some distant point to the Portland cement mills, thereby greatly increasing the cost of production. In fact in some of the mills in the sections above mentioned it is necessary to add as much as one ton of limestone to every two tons of the "cement rock", and to bring this limestone from a distance of over one hundred miles. It is obvious therefore, that if these mills could use the high magnesian limestone deposits, which exist in the immediate neighborhood of the "cement rock" deposits, it would enable the manufacturers to very greatly cheapen the cost of Portland cement manufacture, as it would then be unnecessary to bring low magnesian limestone from distant deposits to mix with the "cement rock."

This invention consists in a process by which a high grade of cement, superior in strength to the best grades of Portland cement, can be made from high magnesian limestone, and particularly limestone containing from 5 to 20 per cent. of magnesia, in connection with "cement rock".

My process in its preferred embodiment consists in mixing with "cement rock" sufficient high magnesian limestone to bring the lime and magnesia in the mixture up to the proper ratio to the silica, iron oxid and alumina, the preferred ratio of the calcarious material to the argillaceous material being approximately 2 to 1. The mixture is then ground to an impalpable powder, burned to the point of incipient vitrifaction and a small percentage, preferably from one to ten per cent. by weight of calcium chlorid is added to the clinker and the mixture ground to the requisite fineness. The proportion of calcium chlorid to the mixture will depend upon the percentage of magnesia in said mixture, satisfactory results being obtained by the addition of 2 per cent. of calcium chlorid to a cement mixture containing eight per cent. of magnesia. Where the cement mixture contains a larger percentage of magnesia, a proportionally larger amount of the chlorid will be required.

In place of calcium chlorid I may employ other chlorids, preferably metal chlorids, such for example as sodium, or other alkaline chlorids, magnesium, or other chlorids of metals of the magnesium group, barium, or other alkaline earth chlorids; the various chlorids being equivalents of the calcium chlorid mentioned, in the practice of my process.

The calcium or other chlorid employed may be added to the materials used in the manufacture of cement before grinding, or before burning, or it may be added to the clinker at any time during the process of grinding, or it may be added to the cement before being used, or to the water or other material mixed with the cement; it being sufficient that the chlorid be incorporated with the high magnesian limestone cement at any time prior to the crystallization or setting of the latter in use, and any such incorporation is deemed to be within the spirit of my invention, and the scope of the protection for which I have made application.

Gypsum or plaster of paris may be added to the materials employed in producing the cement at any time either before or after grinding if found necessary in order to regulate the set. The calcium chlorid, or its equivalent however serves this purpose, so that the addition of gypsum or plaster of paris is in most cases wholly unnecessary.

In use, the calcium or other chlorid employed combines with the free magnesium oxid in the cement when the latter is mixed with water, and not only renders the latter innocuous, but also forms with it an oxychlorid compound having itself great cementing properties. The resulting mixture of Portland cement and oxychlorid cement has greater strength and binding properties than the Portland cement itself. It will thus be seen that in the practice of my invention I am not only able to utilize high magnesian limestone in the manufacture of cement, thereby cheapening the cost of such manufacture, but I am also enabled to produce by such use a superior quality of cement.

Having thus described my invention I claim:

1. The herein described process comprising heating a mixture of argillaceous material and calcarious material containing more than 3 per cent. of magnesia, and incorporating therewith a chlorid.

2. The herein described process comprising heating to incipient vitrifaction a mixture of argillaceous material and magnesian limestone containing more than 3 per cent. of magnesia, and incorporating therewith a metal chlorid.

3. The herein described process comprising heating to incipient vitrifaction a mixture of argillaceous material and magnesian limestone containing more than 4 per cent. of magnesia, and incorporating therewith a chlorid in an amount proportioned to the quantity of magnesia in the said mixture.

4. The herein described process comprising heating to incipient vitrifaction a mixture of argillaceous material and magnesian limestone containing more than 4 per cent. of magnesia, and incorporating calcium chlorid therewith in an amount proportioned to the quantity of magnesia in the said mixture.

5. The herein described process comprising heating to incipient vitrifaction a mixture of argillaceous material and limestone containing from 5 to 20 per cent. of magnesia, and incorporating therewith a chlorid in an amount proportioned to the quantity of magnesia in the said mixture.

In testimony whereof I affix my signature in presence of two witnesses.

RICHARD KIDDER MEADE.

Witnesses:
WILLIAM P. GANO,
LESTER C. HAWK.